United States Patent
Minami et al.

(10) Patent No.: US 7,153,611 B2
(45) Date of Patent: Dec. 26, 2006

(54) LITHIUM SECONDARY BATTERY AND METHOD FOR MANUFACTURING THEREOF

(75) Inventors: Hiroshi Minami, Kobe (JP); Katsunobu Sayama, Kobe (JP); Hiromasa Yagi, Nishinomiya (JP); Atsushi Fukui, Kobe (JP); Mariko Torimae, Kobe (JP); Yasuyuki Kusumoto, Kobe (JP); Hisaki Tarui, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 352 days.

(21) Appl. No.: 10/673,610

(22) Filed: Sep. 30, 2003

(65) Prior Publication Data

US 2004/0072067 A1    Apr. 15, 2004

(30) Foreign Application Priority Data

Sep. 30, 2002    (JP)    ............................. 2002-285741
Feb. 5, 2003     (JP)    ............................. 2003-027805

(51) Int. Cl.
*H01M 6/18*    (2006.01)
*H01M 4/64*    (2006.01)

(52) U.S. Cl. .................. 429/304; 429/303; 429/245; 429/235; 429/217; 429/232; 429/218.1; 429/233; 29/623.1; 29/623.5

(58) Field of Classification Search ................ 429/212, 429/217, 303, 304, 245, 233, 218.1, 235, 429/232; 29/623.1, 623.5
See application file for complete search history.

(56) References Cited

U.S. PATENT DOCUMENTS

2005/0244711 A1 *  11/2005  Fukui et al. ................ 429/217

FOREIGN PATENT DOCUMENTS

| JP | 10-247520 | * | 9/1998 |
| JP | 11-339777 A | | 12/1999 |
| JP | 2000-12088 A | | 1/2000 |
| JP | 2000-21449 A | | 1/2000 |
| JP | 2003-77529 A | | 3/2003 |

* cited by examiner

*Primary Examiner*—Laura Weiner
(74) *Attorney, Agent, or Firm*—Kubovcik & Kubovcik

(57) ABSTRACT

A lithium secondary battery comprising an electrode in which an active material layer which includes an active material that electrochemically occludes and releases lithium is formed on a current collector, wherein cracks are formed in the active material layer by occlusion and release of lithium ions and thereafter a solid electrolyte is formed in the cracks in the active material layer.

18 Claims, 6 Drawing Sheets

LITHIUM SECONDARY BATTERY AND METHOD FOR MANUFACTURING THEREOF

FIELD OF THE INVENTION

The present invention relates to a lithium secondary battery and a method for manufacturing the lithium secondary battery.

BACKGROUND OF THE INVENTION

A lithium secondary battery that comprises a nonaqueous electrolyte and utilizes the transfer of lithium ions between a positive electrode and a negative electrode for charge and discharge of the battery has recently been used as one of new type high output and high energy density batteries.

A lithium secondary battery using a material which forms an alloy with lithium as a negative electrode active material is known. However, it is also known that an active material which forms an alloy with lithium increases and decreases in volume when lithium ions are occluded and released, and the active material is pulverized during charge and discharge cycles and separates from the current collector. This causes deterioration of current collecting characteristics (current collectability) and of charge and discharge cycle characteristics.

A negative electrode for a lithium secondary battery in which an active material layer comprising a silicon material and a binder is formed on a current collector comprising an electrically-conductive metal foil and is sintered on the current collector under a non-oxidizing atmosphere has been proposed (Japanese Patent application No. 2000-401501). The negative electrode provides excellent charge and discharge cycle characteristics.

It has also been found that when a thin amorphous or micro crystalline silicon film which is provided on a current collector comprising an electrically-conductive metal foil by sputtering method or CVD method is used as a negative electrode active material, excellent charge and discharge cycle characteristics are obtained (International Publication No. 01/31720).

However, a negative electrode increases and decreases in volume when an active material occludes and releases lithium ions, cracks occur in the active material layer, and contact resistance in the active material layer increases. This causes deterioration of current collecting characteristics (current collectability) and of charge and discharge cycle characteristics.

OBJECT OF THE INVENTION

An object of the present invention is to provide a lithium secondary battery and a method for preparing the lithium secondary battery which is capable of improving current collectability of an electrode and improving charge and discharge cycle characteristics.

SUMMARY OF THE INVENTION

The present invention relates to a lithium secondary battery comprising a nonaqueous electrolyte and an electrode in which an active material layer which includes an active material that electrochemically occludes and releases lithium is formed on a current collector, and wherein cracks in the active material layer are filled with the nonaqueous electrolyte in the form of a solid electrolyte.

EXPLANATION OF ELEMENTS

Figure 1:
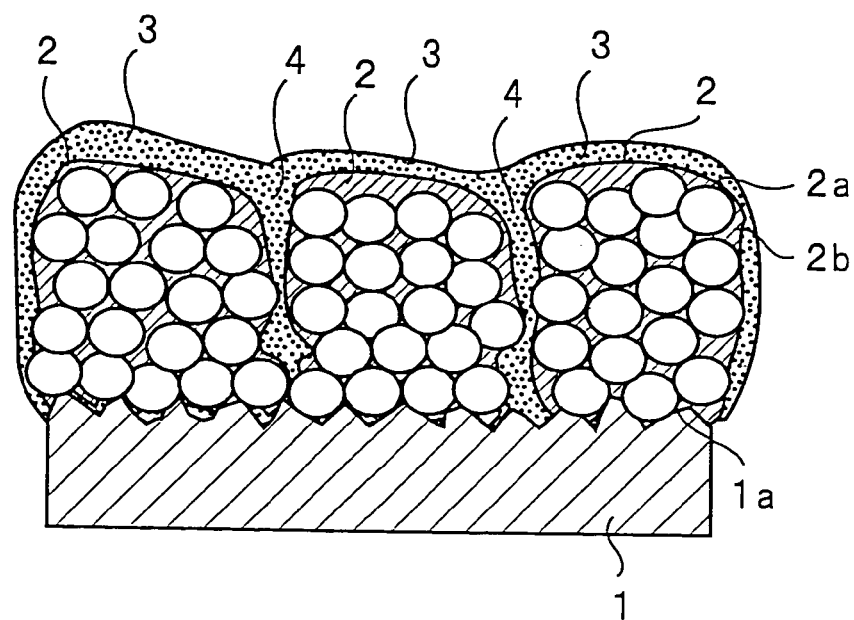
FIG. 1 is a cross section of the negative electrode of an embodiment of the present invention.

1: current collector
1a: surface of current collector
2: active material layer
2a: active material particles
2b: binder
3: solid electrolyte
4: cracks
5: thin film
6: cracks

DETAILED EXPLANATION OF THE INVENTION

When a solid electrolyte is provided in the cracks formed in the active material layer, current collectability of the electrode is improved and charge and discharge cycle characteristics are also improved. The solid electrolyte prevents the active material layer from separating from the current collector. It is also helpful in improving charge and discharge cycle characteristics.

In the present invention, the nonaqueous electrolyte can be a solid electrolyte. That is, the solid electrolyte provided in the cracks can be a part of a solid nonaqueous electrolyte. The nonaqueous electrolyte can also partially include the solid electrolyte. For example, the solid electrolyte can be provided only in the cracks, and the remainder of the nonaqueous electrolyte can be liquid.

As the solid electrolyte, there can be a solid electrolyte in which a polymer and an electrolyte containing a lithium salt are combined to make a gel. That is, a gel polymer in which the polymer supports the electrolyte containing a lithium salt can be illustrated. The solid electrolyte including a gel polymer has excellent adherence to the active material, and the adherence to the active material is not deteriorated by charging and discharging. Therefore, charge and discharge cycle characteristics can be significantly improved. As the polymer, polyether solid polymer, polycarbonate solid polymer, polyacrylonitrile solid polymer, copolymers thereof and crosslinked polymers can be illustrated.

As other polymers, fluoropolymer, for example, polyvinylidene fluoride, polyvinylidene fluoride-hexafluoropropylene copolymer, polytetrafluoroethylene, and the like, polyamide polymer, polyimide polymer, polyimidazole polymer, polyoxazole polymer, polymelamine-formaldehyde polymer, polypropylene polymer, polysiloxane polymer, and the like, can be illustrated.

The solid electrolyte of the present invention can be an entirely solid electrolyte having lithium ion conductivity. As the entirely solid electrolyte, an electrolyte comprising a lithium salt and a polymer can be illustrated. As the polymer for the entirely solid electrolyte, polyether polymer, polysiloxane polymer, and polyphosphazene polymer can be illustrated.

The surface of the current collector onto which the active material layer is provided preferably has a surface roughness (Ra) of at least 0.2 μm. A current collector having such surface roughness can provide a sufficient contact area for the active material layer and the current collector to improve the adhesion of the active material layer and the current collector. When a binder is included in the active material layer, the binder penetrates into the uneven surface of the current collector, and an anchor effect occurs between the binder and the current collector to increase adhesion. Therefore, peeling of the active material layer from the current collector can be prevented. When active material layers are provided on both surfaces of the current collector, both surfaces preferably have a surface roughness of at least 0.2 μm.

The surface roughness (Ra) and the average distance (S) between adjacent local peaks preferably satisfy the relationship $100\,Ra \geq S$. The surface roughness (Ra) and the average distance (S) between adjacent local peaks are defined in the Japanese Industrial Standards (JIS B 0601-1994), and can be measured by a surface roughness tester.

A current collector treated to have a roughened surface can be used in the electrode of the present invention. As a method of roughening the surface, plating, vapor phase epitaxy, etching, polishing and the like can be illustrated. Plating and vapor phase epitaxy are methods for forming an uneven layer on the surface of the current collector. Plating can be electrolytic or non-electrolytic. As vapor phase epitaxy, there can be illustrated sputtering, chemical vapor deposition (CVD), evaporation, and the like. As etching, physical or chemical etching can be used. As polishing, there can be illustrated polishing with sand paper, blasting, and the like.

As the current collector for the present invention, an electrically conductive metal foil is preferable. As examples of such metal foil, a conductive metal foil composed of a metal such as copper, nickel, iron, titanium, cobalt and the like, and an alloy containing any combination thereof can be illustrated. The current collector preferably contains a metal element that easily diffuses into the particles of the active material. From this point of view, when the active material is silicon or the like, a metal foil containing copper is preferred because copper is easily diffused into silicon. Therefore, a copper metal foil and a copper alloy foil are more preferred.

It is also possible to use a metal foil having a layer containing copper on a surface as the current collector to improve adherence of the current collector and the active material layer. That is, a copper or copper alloy layer provided on the surface of a metal foil which does not include copper can be used. As the metal foil having a layer containing copper having a surface roughness (Ra) of at least 0.2 μm, a copper or copper alloy is provided by electrolytic plating on the metal foil. Concretely, an electrolytic copper foil on which a copper or copper alloy plating is formed by electrolytic plating, a nickel foil plated with copper or a copper alloy can be illustrated.

There is no limitation with respect to the thickness of the current collector (Y). However, a thickness of 10~100 μm is preferable. There is no limitation regarding the upper limit of the surface roughness (Ra) of the surface of the current collector. However, the upper limit is preferably not greater than 10 μm because the thickness of the current collector (Y) is preferably in a range of 10~100 μm.

The thickness (X) of the active material layer preferably satisfies relationships with the thickness (Y) of the current collector and the surface roughness (Ra) of the current collector of $5Y \geq X$, and $250\,Ra \geq X$. If such relationships are satisfied, deformation, for example, wrinkles, and the like, of the current collector can be prevented, and the active material layer can be prevented from peeling off of the current collector.

A thickness of the active material layer (X) of not greater than 100 μm is preferred, and a thickness in a range of 10~100 μm is more preferred. The active material layer of the present invention can be active material particles adhered by a binder on the current collector, or can be a thin film deposited on the current collector.

When the active material layer comprises the active material particles and binder, the active material layer is formed by sintering under a non-oxidizing atmosphere after the active material layer is provided on the surface of the current collector. The binder preferably does not completely decompose after the heat treatment for sintering. If the binder remains after the heat treatment and is not decomposed, the binding ability of the binder, as well as sintering, increases adhesion between particles of the active material and between the active material and the current collector. If an electrically conductive metal foil having a surface roughness (Ra) of at least 0.2 μm is used as the current collector, the binder penetrates into the uneven surface of the current collector, and an anchor effect occurs between the binder and the current collector to increase adhesion. Even if the volume of the active material increases or decreases during occluding and releasing of lithium ions, peeling of the active material layer from the current collector can be prevented and excellent charge and discharge cycle characteristics can be obtained.

As the binder, a binder containing polyimide is preferred. Polyimide can be obtained by heat treatment of polyamic acid. Polyimide is obtained by heat treatment of polyamic acid by dehydration condensation to form polyimide. A yield of imide of the polyimide is preferably at least 80%. If the yield of imide of the polyimide is less than 80%, adherence of the active material particles and the current collecter may be deteriorated. The yield of imide means the mol % of the produced polyimide to the polyimide precursor (polyamic acid). Polyimide having an imide yield of at least 80% can be obtained when polyamic acid in N-methyl-2-pyrrolidone (NMP) is heated at 100~400° C. for not less than one hour. If the temperature is 350° C., the imide yield is 80% for about a one hour heat treatment, and is 100% for about a three hour heat treatment. It is preferred in this invention that the binder is not completely decomposed after heat treatment for sintering. Therefore, if polyimide is used as the binder, it is preferred that the heat treatment for sintering is done at a temperature of not greater than 600° C.

An amount of the binder in the active material layer is preferably at least 5% based on the total weight of the active material layer. A volume of the binder is preferably at least 5% of the total volume of the active material layer. If the amount of the binder in the active material layer is too little, the binder may not be able to provide sufficient adhesion in the electrode. If the amount of the binder in the active material layer is excessive, resistance in the electrode increases to make the initial charge difficult. Therefore, the amount of the binder in the active material layer is preferably not greater than 50 weight % of the total weight of the layer, and the volume of the binder in the active material layer is preferably not greater than 50% of the total volume of the layer.

There are no limitations with respect to the negative electrode active material if a material is capable of occluding and releasing lithium. A material which forms an alloy with lithium is preferably used. As such material, silicon, germanium, tin, lead, zinc, magnesium, sodium, aluminum, gallium, indium, and alloys thereof can be illustrated. Especially, silicon, tin, germanium, aluminum, and an alloy thereof are preferable. Silicon is especially preferred because it has a large theoretical capacity. As the silicon alloy, a solid solution of silicon and at least one additional element, an intermetallic compound of silicon and at least one additional element, a eutectic alloy of silicon and at least one additional element, and the like can be illustrated. The alloy can be prepared by arc melting, liquid quenching, mechanical alloying, sputtering, chemical vapor deposition, calcining, or the like. As liquid quench, single roll quenching, double roll quenching, atomizing, for example, gas atomizing, water atomizing, disc atomizing, and the like, can be illustrated.

Particles of the active material coated with a metal or the like can also be used. The particles can be coated by electroless plating, electrolytic plating, chemical reduction, vapor deposition, sputtering, chemical vapor deposition, or the like. As the metal used to coat the surface of the particles, it is preferred to use the same metal as used for the electrically conductive metal foil. If the particles are coated with the same metal as the metal foil, the degree of bonding with the current collector dramatically improves, and excellent charge and discharge cycle characteristics can be obtained.

There are no limitations with respect to the mean diameter of particles of the active material. However, the mean diameter is preferably not greater than 100 μm, and more preferably, not greater than 50 μm, and further preferably, not greater than 10 μm. As the diameter of the active material particle is smaller, better cycle characteristics are obtained.

An electrically conductive powder can be mixed in the active material layer. The active material layer containing the electrically conductive powder can be formed by mixing the electrically conductive powder in a slurry of active material particles and binder. If an electrically conductive powder is mixed in the layer, an electrically conductive network is formed around the particles of the active material to increase current collectability of the electrode. As the electrically conductive powder, materials similar to the electrically conductive metal foil can preferably be used. Concretely, copper, nickel, iron, titanium, cobalt and the like, and an alloy or a mixture of these elements can preferably be used alone or in combination thereof. Copper powder is preferable as a metal powder. An electrically conductive carbon powder can also preferably be used.

As with the active material particles, there are no limitations with respect to the mean diameter of particles of the electrically conductive powder. However, the mean diameter is preferably not greater than 100 μm, and more preferably, not greater than 50 μm, and further preferably, not greater than 10 μm.

Sintering under a non-oxidizing atmosphere can be performed under, for example, a nitrogen atmosphere, an inert gas atmosphere (for example, argon or the like), and the like. It is also possible to perform the sintering under a reducing atmosphere, for example, a hydrogen atmosphere, or the like. The temperature used for the sintering is preferably lower than the melting point of the current collector and of the particles of the active material. For example, when a copper foil is used as the current collector, it is preferred that the sintering temperature is not greater than the melting point of copper, i.e., 1083° C. The temperature used for sintering is preferably in a range of 200~500° C., and more preferably, in a range of 300~400° C. As a method of sintering, spark plasma sintering, hot pressing, or the like, can be used.

In the present invention, preferably after the active material layer is provided on the current collector and prior to sintering, the active material layer with the underlying current collector is subject to rolling. Rolling can increase packing density in the active material layer and adhesion between particles of the active material and between the active material and the current collector to improve charge and discharge cycle characteristics.

As described above, the active material layer can be formed by depositing the active material in the form of a thin film on the current collector. The thin film of the active material can be formed by sputtering, chemical vapor deposition (CVD), evaporation, spray coating, electroless plating, electrolytic plating, and the like. As the active material to form the thin film, silicon, tin, germanium, aluminum, and an alloy containing these elements, and the like, can be illustrated. Silicon is most preferably used. When silicon is used, it is used in a form of an amorphous and micro crystalline silicon film.

As the solid electrolyte in the present invention, a gel electrolyte which is prepared from a polymer and an electrolyte including a lithium salt is preferred as described above. There is no limitation with respect to the solvent to be used for the nonaqueous electrolyte. Cyclic carbonates, for example, ethylene carbonate, propylene carbonate, butylene carbonate, and the like; chain carbonates, for example, dimethyl carbonate, methylethyl carbonate, diethyl carbonate, and the like, can be used alone or in combinations thereof. A mixture of the cyclic carbonate described above and an ether, for example, 1,4-dioxane, 1,2-dimethoxyethane, 1,2-diethoxyethane, and the like, can also be used.

As a lithium salt, $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and the like, can be used alone or in various combinations thereof. A mixture of $LiXF_y$ (where X is P, As, Sb, B, Bi, Al, Ga or In; when X is P, As or Sb, y is 6; and when X is Bi, Al, Ga or In, y is 4) and lithium perfluoroalkylsulfonylimide, $LiN(C_mF_{2m+1}SO_2)(C_nF_{2n+1}SO_2)$ (where m and n are each independently an integer of 1~4), or lithium perfluoroalkylsulfonylmethide, $LiC(C_pF_{2p+1}SO_2)(C_qF_{2q+1}SO_2)(C_rF_{2r+1}SO_2)$ (where p, q and r are each independently an integer of 1~4) can preferably be used. Especially, a mixture of $LiPF_6$ and $LiN(C_2F_5SO_2)_2$ is preferred.

As the positive electrode active material for the lithium secondary battery, lithium-containing transition metal oxides, for example, $LiCoO_2$, $LiNiO_2$, $LiMn_2O_4$, $LiMnO_2$, $LiCo_{0.5}Ni_{0.5}O_2$, $LiNi_{0.7}Co_{0.2}Mn_{0.1}O_2$, and the like, and metal oxides not containing lithium, for example, $MnO_2$, and the like, can be illustrated. In addition to the materials described above, if the material is electrochemically capable of occluding and releasing lithium, the material for the positive electrode is not limited.

As the solid electrolyte, a combination of an electrolyte, including a lithium salt, and polymer and which is gelatinized is preferably used. It is preferable that a monomer of the polymer is added into the electrolyte to gelatinize the electrolyte by polymerization of the monomer.

In a method for manufacturing the lithium secondary battery of the present invention, a negative electrode, a positive electrode and an electrolyte including a lithium salt are housed in a container to prepare a temporary-battery, and the temporary-battery is charged and discharged to create cracks in the active material layer, and then a monomer of a polymer is added to the electrolyte to polymerize the monomer and to gelatinize the electrolyte to prepare a solid electrolyte.

Stated differently, the method for manufacturing the lithium secondary battery of the present invention is a method to prepare the battery including a negative and positive electrode wherein an active material layer including an active material electrochemically capable of occluding and releasing lithium is formed on a current collector of an electrode and cracks formed in the active material layer created by occluding and releasing lithium are filled with the solid electrolyte prepared from the polymer and electrolyte. The method comprises preparing a temporary-battery comprising the negative electrode, positive electrode and electrolyte in the container, wherein the electrolyte includes a lithium salt, forming cracks in the active material layer by charging and discharging the temporary-battery, and forming in the cracks, the solid electrolyte that is prepared by gelatinizing the electrolyte by polymerization of the monomer added to the electrolyte in the temporary-battery after formation of the cracks.

According to the method of the present invention, the temporary-battery containing the electrolyte before gelatinization of the electrolyte is charged and discharged to form cracks in the active material layer of the negative electrode. The electrolyte penetrates into the cracks formed in the active material layer. The monomer is added into the electrolyte and is polymerized to form the solid electrolyte by gelatinizating the electrolyte. Therefore, the solid electrolyte can be easily filled in the cracks in the active material layer.

FIG. 1 is a cross section of a negative electrode of the present invention comprising an active material layer comprising active material particles and a binder. As shown in FIG. 1, a surface 1a of a current collector 1 is unevenly formed, and an active material layer 2 is formed on the current collector. The active material layer 2 comprises active material particles 2a and binder 2b, and includes cracks 4 in a direction of thickness. The cracks 4 are formed by the occlusion and release of lithium from the active material particles 2a. A solid electrolyte 3 is penetrated into the cracks 4. Each part of the active material layer 2 separated by the cracks is covered by the solid electrolyte 3.

The solid electrolyte 3 having lithium ion conductivity fills the cracks 4 of the active material layer 2 to prevent the active material layer 2 from peeling off or separating from the current collector 1, and improves charge and discharge cycle characteristics.

The active material layer 2 is held together by the mechanical strength of the solid electrolyte 3. Therefore, the active material layer 2 is prevented from coming off the current collector 1, and charge and discharge cycle characteristics are improved.

According to another aspect of the present invention, at least one of the active material layers of the positive electrode and the negative electrode is formed by deposition of the active material as a thin film on the current collector, and the solid electrolyte is filled in cracks formed in the active material layer by occluding and releasing lithium.

A lithium secondary battery according to the another aspect of the invention includes positive and negative electrodes, in which an active material layer includes an active material electrochemically capable of occluding and releasing lithium, and a nonaqueous electrolyte, wherein at least one of the active material layers of the positive and negative electrodes is formed as a thin film on the current collector by deposition of an active material, and cracks formed in the active material layer by occluding and releasing lithium are filled with a solid electrolyte.

The lithium secondary battery of the other aspect of the present invention can be manufactured by preparing a temporary-battery comprising the positive electrode, the negative electrode and the electrolyte comprising a lithium salt; forming cracks in the active material layer by charging and discharging the temporary-battery; adding a monomer of a polymer to the electrolyte in the temporary-battery; and then polymerizing the monomer to prepare the solid electrolyte by gelatinization of the electrolyte and to form the solid electrolyte in the cracks.

Figure 5:
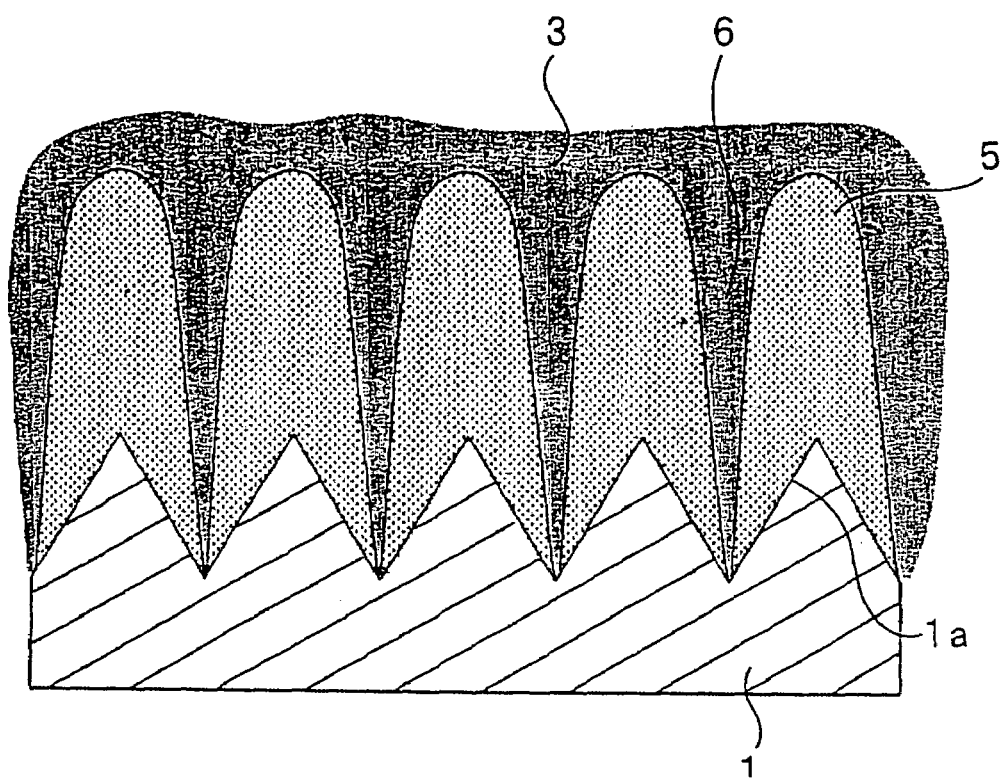
FIG. 5 is a cross section of the electrode of another embodiment of the present invention.

FIG. 5 is a cross section of an electrode of a second aspect of the present invention. As shown in FIG. 5, a surface 1a of the current collector 1 is unevenly formed. A thin film 5 as an active material layer is formed on the uneven surface of the current collector. Cracks 6 are formed in a direction of thickness of the thin film 5. The cracks 6 are formed by occluding and releasing lithium from the thin film 5. The thin film 5 was continuous before the cracks were formed and the surface of the thin film was uneven corresponding to the surface of the current collector. The thin film 5 increases and decreases in volume when lithium ions are occluded and released, and stress generated by change of volume creates cracks 6 starting from a valley of the surface of the thin film toward a direction of the thickness. The thin film 5 has a pillar structure divided by cracks 6.

As shown in FIG. 5, the solid electrolyte is filled into the cracks 6. Each portion of the thin film 5 divided by the cracks is covered by the solid electrolyte. Therefore, current collectability of the electrode can be improved because the solid electrolyte having lithium ion conductivity fills the cracks 6 of the thin film 5.

The thin film 5 is held together by the mechanical strength of the solid electrolyte 3. Therefore, the thin film 5 is prevented from coming off the current collector 1, and charge and discharge cycle characteristics are improved.

DESCRIPTION OF PREFERRED EMBODIMENTS

Embodiments of the present invention are explained in detail below. It is of course understood that the present invention is not limited to these embodiments and can be modified within the spirit and scope of the appended claims.

Experiment 1

[Preparation of Negative Electrode]

81.8 parts by weight of the silicon powder (purity 99.9%) was added to 8.6 weight % of a N-methyl-2-pyrrolidone solution containing 18.2 weight parts of polyimide as a binder and the components were mixed and kneaded by a pestle in a mortar to prepare a negative electrode mixture slurry.

The slurry was coated on one surface of an electrolytic copper foil (thickness: 35 μm) having a surface roughness (Ra) of 0.5 µm which is a current collector, and was rolled after drying. The coated copper foil was sintered by heating at 400° C. for 30 hours under an argon atmosphere to prepare a negative electrode. The thickness of the electrode (including the current collector) was 50 µm. Therefore, the thickness of the active material layer was 15 µm. Thickness of the active material layer (X)/surface roughness of the copper foil (Ra) was 30. Thickness of the active material layer (X)/thickness of the copper foil (Y) was 0.43.

In the negative electrode, the density of the polyimide was 1.1 g/cm$^3$, and the volume of polyimide was 31.8% based on the total volume of the active material layer including polyimide.

[Preparation of Positive Electrode]

$Li_2CO_3$ and $CoCO_3$ were measured to an atomic ratio of 1:1 and were mixed in a mortar. The mixture was pressed in a mold having a diameter of 17 mm, and was sintered at 800° C. for 24 hours in air to obtain sintered $LiCoO_2$. It was ground in a mortar to particles having a mean diameter of 20 µm.

90 parts by weight of the $LiCoO_2$ powder and 5 parts by weight of artificial carbon powder as a electrically conductive agent were mixed with 5 weight % of N-methyl-2-pyrrolidone solution containing 5 parts by weight of polyfluorovinylidene as a binder to prepare a positive electrode mixture slurry. The slurry was coated on aluminum foil which was a current collector, and was rolled after drying to prepare a positive electrode.

[Preparation of Electrolyte]

1 mol/l $LiPF_6$ was dissolved in a mixture (3:7) of ethylene carbonate and diethylene carbonate and 5 weight % of vinylene carbonate was added to prepare an electrolyte.

[Preparation of Pregel Solution]

Tripropylene glycol diacrylate (molecular weight 300) and the electrolyte were mixed in a ratio by mass of 1:7, and 5000 ppm of t-hexyl peroxy pivalate as a polymerization initiator was added to the mixture to prepare a pregel solution.

[Assembly of Battery]

The positive and negative electrodes with positive and negative electrode current collecting tabs mounted thereon and a separator made of porous polyethylene were rolled and placed in an outer battery can made of an aluminum laminate to prepare a temporary-battery having an outer measurement of 35 mm in width, 50 mm in length and a thickness of 3.5 mm. The temporary-battery was charged to 4.2 V at a current of 50 mA, and then was discharged to 2.75 V at a current of 50 mA. Then the same weight of the pregel solution as the electrolyte in the temporary-battery was added into the battery and the solution and the electrolyte were mixed and left for four hours to provide a uniform mixture. The battery was heated at 60° C. for three hours to gelatinize the mixture to prepare a battery A1. The polymerizable compound (monomer) in the pregel solution, tripropylene glycol diacrylate, was polymerized by heating of the mixture, and the electrolyte was held in a mesh structure of the polymer to form a so-called gel polymer solid electrolyte.

Figure 2:
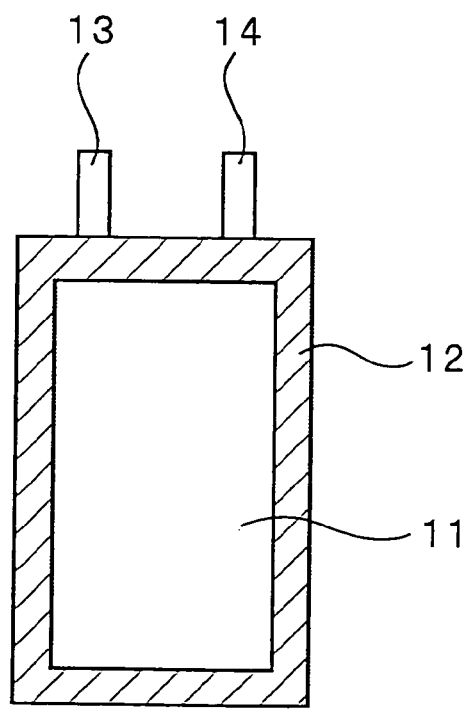
FIG. 2 is a plan view of the lithium secondary battery prepared in the Experiments.

FIG. 2 is a plan view of the lithium secondary battery prepared above. The lithium secondary battery is sealed by heat sealing of outer edge of the outer battery can 11 made of an aluminum laminate to form sealed opening 12. The positive electrode current collecting tab 13 and the negative electrode current collecting tab 14 are mounted on an upper part of the outer battery can 11. The set of electrodes separated by the separator made of porous polyethylene is inserted in the outer battery can 11.

[Observation of Negative Electrode After Charge and Discharge of Temporary-battery]

Figure 3:
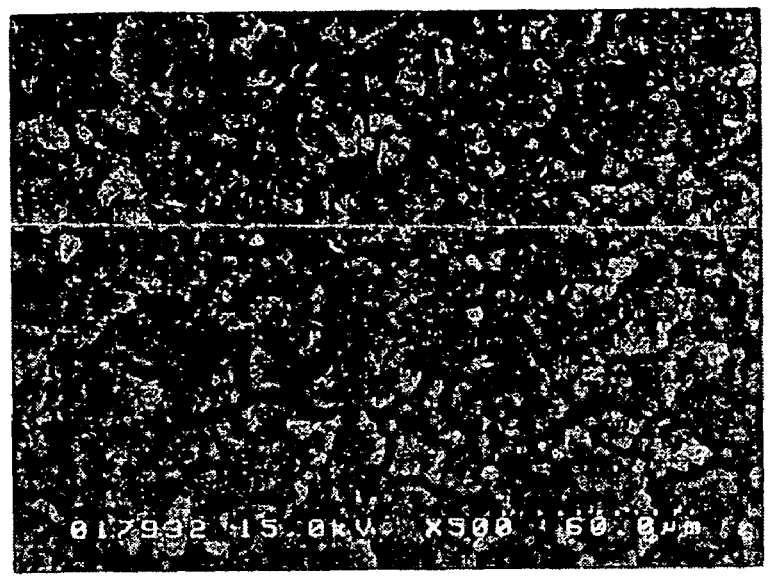
FIG. 3 is a photograph taken by a scanning electron microscope from the top showing the condition of the negative electrode having cracks after charging and discharging.
Figure 4:
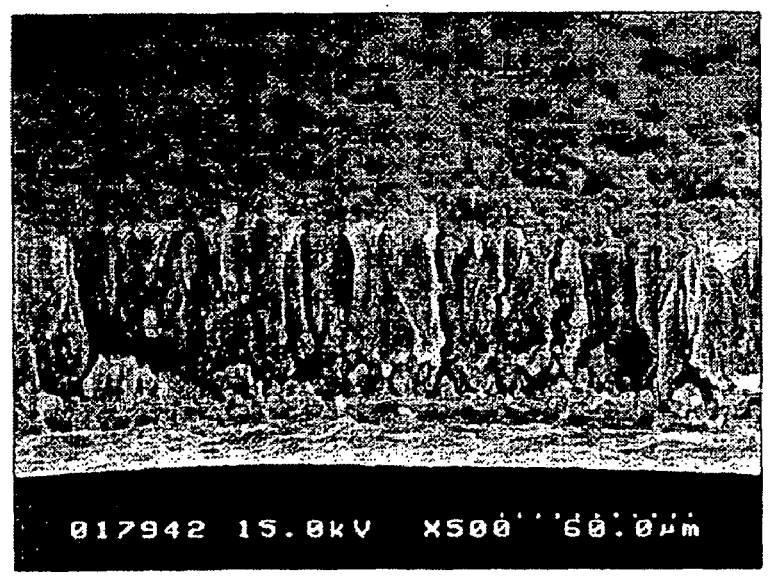
FIG. 4 is a photograph taken by a scanning electron microscope showing the condition of a cross section of the negative electrode having cracks after charging and discharging.

FIGS. 3 and 4 are photographs taken by a scanning electron microscope showing the condition of the negative electrode after charging and discharging of the temporary-battery. As is clear from FIGS. 3 and 4, a crack in a direction of thickness of the active material layer was formed by charging and discharging of the temporary-battery. In this example, the pregel solution was added after the cracks were formed and then the gel polymer solid electrolyte was formed. Therefore, the gel polymer solid electrolyte formed to fill the cracks.

Experiment 2

Battery B1 was prepared in the same manner as in Experiment 1 except that the temporary-battery was not charged and discharged.

Battery B2 was prepared in the same manner as in Experiment 1 except that an electrolyte without a monomer and a polymerization initiator was used instead of the pregel solution.

Charge and discharge cycle characteristics of batteries A1, B1 and B2 were evaluated. Each battery was charged to 4.2 V at a current of 100 mA and 25° C., and then was discharged to 2.75 V at a current of 100 mA and 25° C. (this is considered to be one charge and discharge cycle). The number of cycles to reach 80% of the discharge capacity of the first cycle was measured to determine the cycle life of the battery. The results are shown in Table 1. The cycle life of each battery is shown as an index when the cycle life of the battery A1 is taken as 100.

TABLE 1

| Battery | Charge/Discharge of Temporary-battery | Pregel Solution | Cycle Life |
|---|---|---|---|
| A1 | Yes | Yes | 100 |
| B1 | No | Yes | 23 |
| B2 | Yes | No | 69 |

In battery A1, the temporary battery was charged and discharged to form cracks in the active material layer, and then the electrolyte was gelatinized. In contrast, the solid electrolyte was formed before battery B1 was charged and discharged, and cracks in the active material layer were formed after the solid electrolyte was formed. Therefore, the solid electrolyte did not penetrate into the cracks.

The battery B2 was charged and discharged after the temporary-battery was assembled, but the pregel solution was not used. The electrolyte was not gelatinized, i.e., the electrolyte was in a normal liquid condition.

As is clear the results shown in Table 1, battery A1 of the present invention had a longer cycle life in comparison with battery B1. It is believed that the solid electrolyte filled the cracks in the active material layer, current collectability of the electrode was increased and the active material was efficiently used. The solid electrolyte in the cracks held the active material layer together to prevent the active material layer from separating from the current collector and to improve charge and discharge cycle characteristics.

Experiment 3

The effect of surface roughness (Ra) of the current collector was evaluated.

Batteries A2 and A3 were prepared in the same manner as Experiment 1 except that electrolytic copper foils having a surface roughness (Ra) of 0.2 μm and 0.17 μm, respectively, were used instead of the electrolytic copper foil having a surface roughness (Ra) of 0.5 μm.

Cycle characteristics of batteries A2 and A3 were evaluated in the same manner described above. Cycle life is described as an index when the cycle life of battery A1 is taken as 100. Table 2 also includes the cycle life of battery A1.

TABLE 2

| Battery | Roughness of Surface of Current Collector (μm) | Cycle Life |
|---|---|---|
| A1 | 0.5 | 100 |
| A2 | 0.2 | 87 |
| A3 | 0.17 | 76 |

As is clear from the results shown in Table 2, batteries A1 and A2 prepared using a current collector having a surface roughness (Ra) of at least 0.2 μm have excellent cycle characteristics as compared to battery A3 prepared using a current collector having a surface roughness (Ra) of less than 0.2 μm. It is believed that the contact area of the particles of the active material and the surface of the current collector is increased by using a metal foil having a surface roughness (Ra) of at least 0.2 μm. Additionally, sintering effectively increases adhesion of the particles of the active material and the current collector, and the binder penetrates into uneven portions of the surface of the current collector, and the adhesion increases because of an anchor effect occurring in the binder and the current collector to increase current collectability of the electrode.

Experiment 4

The effect of sintering conditions of the electrodes on cycle characteristics was evaluated. Battery A4 was prepared in the same manner as Experiment 1 except that the electrode was treated at 550° C. for ten hours. Battery B3 was prepared in the same manner as Experiment 1 except that the electrode was not treated by heat.

Cycle characteristics of batteries A4 and B3 were evaluated in the same manner described above. Cycle life is described as an index when the cycle life of battery A1 is taken as 100. Table 3 also includes the cycle life of battery A1.

TABLE 3

| Battery | Heat Treatment Condition of Electrode | Cycle Life |
|---|---|---|
| A1 | 400° C., 30 hrs | 100 |
| A4 | 550° C., 10 hrs | 75 |
| B3 | None | 32 |

As is clear from the results shown in Table 3, batteries A1 and A4 have excellent cycle characteristics as compared to battery B3 prepared without heat treatment of the electrode. It is believed that the particles of the active material and the current collector were sintered by heat treatment and adhesion of the active material layer and current collector increased to improve the current collectability of the electrode.

Battery A4 in which the electrode is treated at 550° C. for ten hours reduced the cycle characteristics as compared to battery A1 in which the electrode is treated at 400° C. for 30 hours. It appears that the binder was decomposed by the heat treatment at 550° C., and adhesion resulting from the binder in the electrode was significantly reduced to decrease the current collectability.

Experiment 5

The effect of an electrically conductive powder added to the active material layer was evaluated.

Battery A5 was prepared in the same manner as Experiment 1 except that 20 weight % (based on the weight of the copper powder and the silicon powder) of copper powder of a mean diameter of 3 μm was added to the silicon powder. Cycle characteristics of battery A5 were evaluated in the same manner as described above. Cycle life is described as an index when the cycle life of battery A1 is taken as 100. Table 4 also includes the cycle life of battery A1.

TABLE 4

| Battery | Electrically-Conductive Powder | Cycle Life |
|---|---|---|
| A1 | None | 100 |
| A5 | Copper Powder | 103 |

As is clear from the results shown in Table 4, battery A5 in which copper powder is added to the active material had better cycle characteristics than battery A1 which did not include electrically conductive powder in the active material. The electrically conductive powder is believed to have formed a network around the particles of active material to improve the current collectability in the active material layer.

Experiment 6

[Preparation of Negative Electrode]

Copper was deposited by electrolysis on a surface of a rolled copper film of a thickness of 18 μm to prepare a copper film having a roughened surface (thickness of 26 μm, surface roughness Ra of 0.21 μm). An amorphous silicon thin film was deposited by sputtering to a thickness of 5 μm. Direct current pulse was used as power for sputtering. Conditions of sputtering are as follows:

| | |
|---|---|
| Frequency of direct current pulse: | 100 kHz |
| Width of direct current pulse: | 1856 ns |
| Power of direct current pulse: | 2000 W |
| Argon flow rate: | 60 sccm |
| Pressure of Gas: | $2.0 \sim 2.5 \times 10^{-1}$ Pa |
| Time: | 146 minutes |

The obtained silicon thin film was cut with the current collector to 25 mm×25 mm to prepare a negative electrode.

[Preparation of Positive Electrode]

A positive electrode mixture slurry was prepared in the same manner as Experiment 1. The slurry was coated on aluminum foil which was a current collector, and was rolled after drying. A 20 mm×20 mm piece was cut out from the coated aluminum foil to prepare a positive electrode.

[Preparation of Electrolyte]

An electrolyte was prepared in the same manner as in Experiment 1.

[Preparation of Pregel Solution]

A pregel solution was prepared in the same manner as in Experiment 1.

[Assembly of Battery]

A temporary-battery was prepared in the same manner as in Experiment 1. The temporary-battery was charged to 4.2 V at a current of 1.3 mA, and then was discharged to 2.75 V at a current of 1.3 mA. Then the same weight of the pregel solution as the electrolyte in the temporary-battery was added into the battery, the solution and the electrolyte were mixed and left for four hours to provide a uniform mixture. The battery was heated at 60° C. for three hours to gelatinize the mixture to prepare a battery A6. The polymerizable compound (monomer) in the pregel solution, tripropylene glycol diacrylate, was polymerized by the heating of the mixture, and the electrolyte was held in a mesh structure of the polymer to form a so-called a gel polymer solid electrolyte.

Experiment 7

A battery B4 was prepared in the same manner as in Experiment 6 except that the temporary-battery was not charged and discharged after being assembled.

[Evaluation of Charge and Discharge Characteristics]

Charge and discharge cycle characteristics of batteries A6 and B4 were evaluated. Each battery was charged to 4.2 V at a current of 1.3 mA and 25° C., and then was discharged to 2.75 V at a current of 1.3 mA and 25° C. This is considered to be one charge and discharge cycle.

The initial discharge capacity (discharge capacity at the first cycle) and capacity maintenance rate after ten cycles are shown in Table 5. After the tenth cycle was completed, discharge capacity was measured and measurement of capacity maintenance rate was calculated according to expression (2) below.

Capacity Maintenance Rate (%)=(discharge capacity after ten cycles/initial discharge capacity)×100    (2)

Figure 6:
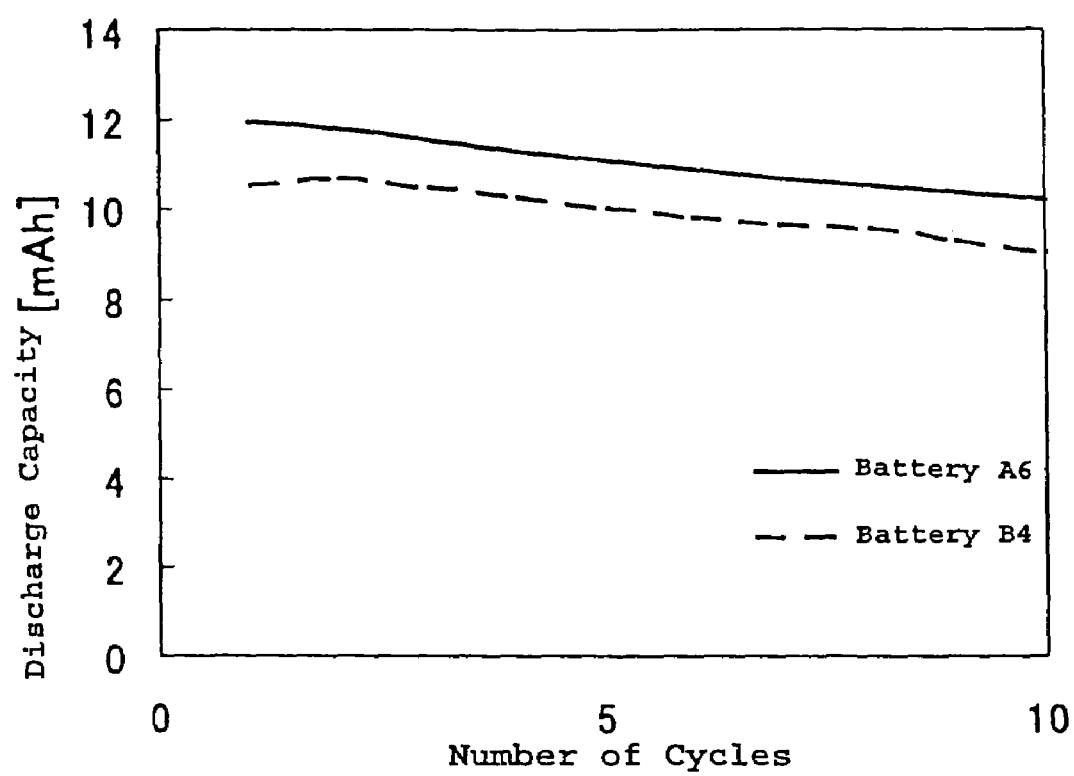
FIG. 6 is a graph showing charge and discharge characteristics of an embodiment of the present invention.

The charge and discharge cycle characteristics are shown in FIG. 6.

TABLE 5

| Battery | Charge/Discharge of Preliminary Battery | Initial Charge Capacity (mAh) | Capacity Maintenance Rate after 10 Cycles (%) |
|---|---|---|---|
| A6 | Yes | 11.9 | 93.3 |
| B4 | No | 10.6 | 86.1 |

As is clear from FIG. 6 and Table 5, battery A6 of the present invention has better charge and discharge cycle characteristics as compared to the comparative battery B4.

[Observation of Negative Electrode After Charge and Discharge of Temporary-battery]

Figure 7:
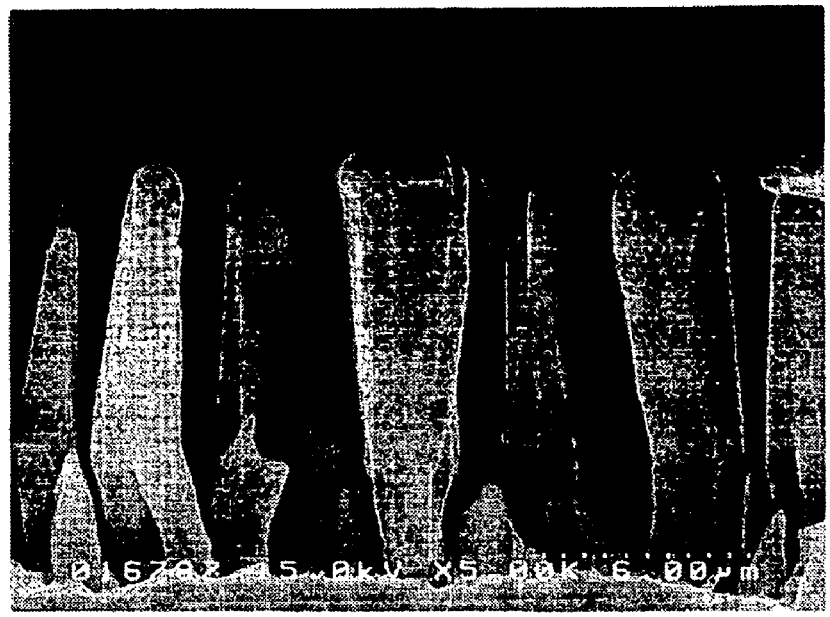
FIG. 7 is a photograph taken by a scanning electron microscope showing the condition of a cross section of the electrode having cracks in the thin film after charging and discharging.

FIG. 7 is a photograph taken by a scanning electron microscope showing the condition of the negative electrode after charging and discharging of the temporary-battery. As is clear from FIG. 7, cracks in a direction of thickness of the active material layer were formed by charging and discharging of the temporary-battery. In this example, the pregel solution was added after the cracks were formed and then the gel polymer solid electrolyte was formed. Therefore, the gel polymer solid electrolyte formed and filled the cracks.

Experiment 8

[Preparation of Positive Electrode]

The negative electrode in Experiment 6 was used as a positive electrode.

[Assembly of Battery]

A temporary-battery was prepared in the same manner as in Experiment 1 except for the use of the positive electrode described above and the use of a negative electrode made of lithium metal. Battery A7 was prepared from the temporary-battery in the same manner as Experiment 6.

Experiment 9

Battery B5 was prepared in the same manner as in Experiment 8 except that the temporary-battery was not charged and discharged after being assembled.

[Evaluation of Charge and Discharge Characteristics]

Charge and discharge cycle characteristics of batteries A7 and B5 were evaluated. Each battery was charged to 0 V at a current of 4 mA and 25° C., and then was discharged to 2.0 V at a current of 4 mA and 25° C. This is considered to be one charge and discharge cycle. The initial discharge capacity and capacity maintenance rate after ten cycles are shown in Table 6. Cycle characteristics during the charge and discharge test are shown in FIG. 8.

TABLE 6

| Battery | Charge/Discharge of Preliminary Battery | Initial Charge Capacity (mAh) | Capacity Maintenance Rate after 10 Cycles (%) |
|---|---|---|---|
| A7 | Yes | 14.4 | 99.3 |
| B5 | No | 12.5 | 92.5 |

Figure 8:
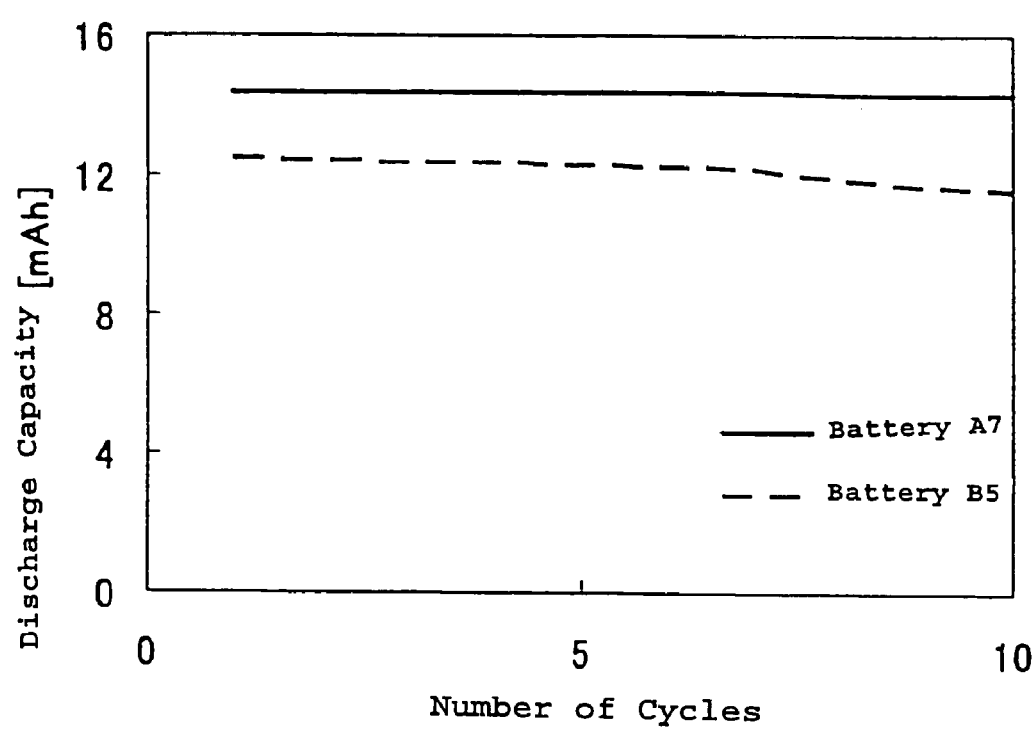
FIG. 8 is a graph showing charge and discharge characteristics of a battery of the present invention.

As is clear from FIG. 8 and Table 6, battery A7 of the present invention has excellent charge and discharge cycle characteristics.

ADVANTAGES OF THE INVENTION

The present invention improves current collectability of an electrode, and provides a lithium secondary battery having excellent charge and discharge cycle characteristics.

What is claimed is:

1. A lithium secondary battery comprising an electrode and a nonaqueous electrolyte, the electrode comprising an active material layer provided on a current collector and containing an active material which is capable of electrochemically occluding and releasing lithium and having cracks formed in the layer by occlusion and releasing of lithium, the cracks of the active material layer being filled with the nonaqueous electrolyte in the form of a solid electrolyte and wherein a surface roughness (Ra) of a surface of the current collector is at least 0.2 μm.

2. The lithium secondary battery according to claim 1, wherein the entirety of the nonaqueous electrolyte is the solid electrolyte.

3. The lithium secondary battery according to claim 1, wherein the nonaqueous electrolyte partially comprises the solid electrolyte.

4. The lithium secondary battery according to claim 1, wherein the solid electrolyte is a gel polymer electrolyte comprising a polymer and an electrolyte containing a lithium salt.

5. The lithium secondary battery according to claim 4, wherein the polymer is a polyether solid polymer, polycarbonate solid polymer, polyacrylonitrile solid polymer, copolymers of at least two of these polymers or crosslinked polymers thereof.

6. The lithium secondary battery according to claim 1, wherein the current collector is a copper foil, a copper alloy foil or a metal foil having a copper layer or a copper alloy layer on a surface thereof.

7. The lithium secondary battery according to claim 1, wherein the current collector is an electrolytic copper foil, an electrolytic copper alloy foil or a metal foil having an electrolytic copper layer or an electrolytic copper alloy layer on a surface thereof.

8. The lithium secondary battery according to claim 1, wherein the active material layer is deposited on the current collector as a thin film.

9. The lithium secondary battery according to claim 1, wherein the active material is silicon, tin, germanium, aluminum, or an alloy containing these elements.

10. A lithium secondary battery comprising an electrode and a nonaqueous electrolyte, the electrode comprising an active material layer provided on a current collector and containing an active material which is capable of electrochemically occluding and releasing lithium and having cracks formed in the layer by occlusion and releasing of lithium, the cracks of the active material layer being filled with the nonaqueous electrolyte in the form of a solid electrolyte and wherein the active material layer is formed by sintering, under a non-oxidizing atmosphere, a slurry comprising particles of the active material and a binder applied on the surface of the current collector.

11. The lithium secondary battery according to claim 10, wherein the binder remains after sintering.

12. The lithium secondary battery according to claim 10, wherein the binder is a polyimide.

13. The lithium secondary battery according to claim 10, wherein the mean diameter of the active material particles is 10 μm or less.

14. The lithium secondary battery according to claim 10, wherein an electrically-conductive powder is mixed in the slurry, and the electrically-conductive powder is included in the active material layer.

15. The lithium secondary battery according to claim 10, wherein the active material layer is formed by coating the slurry on the current collector, drying the slurry, rolling the dried slurry and then sintering.

16. A method for manufacturing a lithium secondary battery comprising a nonaqueous electrolyte and an electrode on which an active material layer containing an active material capable of electrochemically occluding and releasing lithium is formed on a current collector, wherein cracks which are formed in the active material layer by occlusion and release of lithium are filled with a solid electrolyte, comprising:

preparing a temporary-battery comprising the electrode and the electrolyte comprising a lithium salt;

forming cracks in the active material layer by charging and discharging the temporary-battery;

adding a polymerizable monomer to the electrolyte in the temporary-battery and polymerizing the monomer to form the solid electrolyte and to fill the cracks with the solid electrolyte thereby forming the battery.

17. A lithium secondary battery comprising an electrode and a nonaqueous electrolyte, the electrode comprising an active material layer formed on a current collector by deposition of an active material which is capable of electrochemically occluding and releasing lithium and having cracks formed in the layer by occlusion and releasing of lithium, the cracks of the active material layer being filled with the nonaqueous electrolyte in the form of a solid electrolyte.

18. A method for manufacturing a lithium secondary battery comprising a nonaqueous electrolyte and an electrode on which an active material layer containing an active material capable of electrochemically occluding and releasing lithium is formed as a thin film on a current collector, wherein cracks which are formed in the active material layer by occlusion and release of lithium are filled with a solid electrolyte, comprising:

preparing a temporary-battery comprising the electrode in which an active material layer containing an active material capable of electrochemically occluding and releasing lithium is formed by depositing a thin film of the active material on a current collector, and the electrolyte comprising a lithium salt;

forming cracks in the active material layer by charging and discharging the temporary-battery;

adding a polymerizable monomer to the electrolyte in the temporary-battery and polymerizing the monomer to form the solid electrolyte and to fill the cracks with the solid electrolyte thereby forming the battery.

* * * * *